US012811805B2

(12) United States Patent
Zhang et al.

(10) Patent No.: US 12,811,805 B2
(45) Date of Patent: Nov. 24, 2026

(54) SIGNATURE AUTHENTICATION METHODS AND APPARATUSES

(71) Applicant: Alipay (Hangzhou) Information Technology Co., Ltd., Hangzhou (CN)

(72) Inventors: Wanqiao Zhang, Hangzhou (CN); Lin Huang, Hangzhou (CN); Yujia Liu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 22 days.

(21) Appl. No.: 18/979,840

(22) Filed: Dec. 13, 2024

(65) Prior Publication Data

US 2025/0112784 A1 Apr. 3, 2025

Related U.S. Application Data

(63) Continuation of application No. PCT/CN2023/127184, filed on Oct. 27, 2023.

(30) Foreign Application Priority Data

Dec. 26, 2022 (CN) ......................... 202211673944.6

(51) Int. Cl.
*H04L 9/32* (2006.01)
*H04L 9/08* (2006.01)

(52) U.S. Cl.
CPC ............ *H04L 9/3247* (2013.01); *H04L 9/088* (2013.01)

(58) Field of Classification Search
CPC ... H04L 9/3247; H04L 9/088; H04L 63/0815; H04L 63/0823; H04L 9/3234;
(Continued)

(56) References Cited

U.S. PATENT DOCUMENTS 12,562,251 B1 * 2/2026 Hinkel .................. A61M 5/142
2010/0250957 A1 * 9/2010 Cuppett .................. G06F 21/41 713/186

(Continued)

FOREIGN PATENT DOCUMENTS

CN 105704123 A 6/2016
CN 105959249 A * 9/2016 ......... H04L 63/0876

(Continued)

OTHER PUBLICATIONS

International Search Report and Written Opinion in International Appln. No. PCT/CN2023/127184, mailed on Jan. 23, 2024, 15 pages (with English translation).

(Continued)

*Primary Examiner* — Amir Mehrmanesh
*Assistant Examiner* — Aayush Aryal
(74) *Attorney, Agent, or Firm* — Fish & Richardson P.C.

(57) ABSTRACT

Embodiments of this specification provide signature authentication methods and apparatuses. A service private key for signature authentication is embedded in a trusted execution environment (TEE) of a terminal device in which a client is located. In an implementation, a method includes the following. The client sends a signature authentication request to a server. The client receives authentication data information sent from the server. The client encrypts the authentication data information by using a key that is pre-synchronized with the TEE. The client sends encrypted authentication data information to the TEE. The client then receives the signature data sent from the TEE and sends the signature data to the server.

18 Claims, 6 Drawing Sheets

(58) Field of Classification Search

CPC ... H04L 63/0861; H04L 63/12; H04L 9/3231; G06F 21/32

See application file for complete search history.

(56) References Cited

U.S. PATENT DOCUMENTS

| | | | | |
|---|---|---|---|---|
| 2016/0165433 | A1* | 6/2016 | Larignon | H04W 8/205 455/419 |
| 2018/0254898 | A1* | 9/2018 | Sprague | H04L 9/0637 |
| 2018/0336554 | A1* | 11/2018 | Trotter | H04L 63/0853 |
| 2019/0058596 | A1* | 2/2019 | Chang | H04L 9/3247 |
| 2019/0190718 | A1* | 6/2019 | Wease | H04L 9/3242 |
| 2019/0312863 | A1* | 10/2019 | Chow | H04L 9/0643 |
| 2019/0318382 | A1* | 10/2019 | Yang | G06Q 20/326 |
| 2020/0028693 | A1* | 1/2020 | Wu | H04L 9/3263 |
| 2020/0067922 | A1 | 2/2020 | Avetisov et al. | |
| 2020/0280550 | A1* | 9/2020 | Lindemann | H04L 9/3231 |
| 2020/0322155 | A1* | 10/2020 | Cohen | H04L 9/3231 |
| 2020/0372495 | A1* | 11/2020 | Maheshwari | G06Q 20/3678 |
| 2020/0382494 | A1* | 12/2020 | Park | H04L 9/3247 |
| 2021/0044976 | A1* | 2/2021 | Avetisov | H04W 12/08 |
| 2021/0075589 | A1* | 3/2021 | Li | G06F 16/2379 |
| 2021/0377224 | A1* | 12/2021 | Soriente | H04L 9/3234 |

FOREIGN PATENT DOCUMENTS

| | | | | | |
|---|---|---|---|---|---|
| CN | 109150548 | A | | 1/2019 | |
| CN | 111030814 | A | * | 4/2020 | H04L 63/1441 |
| CN | 111669408 | A | | 9/2020 | |
| CN | 112438034 | A | | 3/2021 | |
| CN | 114676392 | A | | 6/2022 | |
| CN | 115001817 | A | | 9/2022 | |
| CN | 115801287 | A | | 3/2023 | |
| EP | 3288214 | A1 | | 2/2018 | |

OTHER PUBLICATIONS

Extended European Search Report in European Appln. No. 23909549.0, mailed on Oct. 2, 2025, 12 pages.

International Preliminary Report on Patentability in International Appln. No. PCT/CN2023/127184, mailed on Jul. 10, 2025, 12 pages (with English translation).

* cited by examiner

SIGNATURE AUTHENTICATION METHODS AND APPARATUSES

CROSS-REFERENCE TO RELATED APPLICATIONS

This application is a continuation of PCT Application No. PCT/CN2023/127184, filed on Oct. 27, 2023, which claims priority to Chinese Patent Application No. 202211673944.6, filed on Dec. 26, 2022, and each application is hereby incorporated by reference in its entirety.

TECHNICAL FIELD

One or more embodiments of this specification relate to network communication technologies, and in particular, to signature authentication methods and apparatuses.

BACKGROUND

With development of Internet technologies, biometric feature identification has been used as an identity authentication method in many service scenarios. To be specific, a biometric feature of a user, such as fingerprint information or face information, is used instead of a password manually entered by the user, such as a password in a digital/alphabetic form, to authenticate an identity of the user.

To ensure convenience, security, and credibility of biometric feature identification as an identity authentication method, a new signature authentication technology, referred to as Internet Finance Authentication Alliance (IFAA), emerges at present. Referring to FIG. 1, in the new signature technology, a service private key is embedded in a trusted execution environment (TEE) of a terminal device such as a mobile phone before delivery of the terminal device, and a client and the TEE cooperate to complete signing. In various service scenarios such as face authentication, the terminal device can sign based on the new signature authentication technology. A server performs authentication on signatures, and provides services after the authentication succeeds.

However, current signature authentication methods are not secure enough.

SUMMARY

One or more embodiments of this specification describe signature authentication methods and apparatuses, which can improve security of signature authentication.

According to a first aspect, a signature authentication method is provided, applied to a client. A service private key required for signature authentication is embedded in a TEE of a terminal device in which the client is located, and the TEE performs verification on a biometric feature of a user. The method includes: The client sends a signature authentication request to a server. The client receives authentication data information sent from the server. The client encrypts the authentication data information by using a key that is synchronized with the TEE in advance. The client sends encrypted authentication data information to the TEE. The client receives signature data sent from the TEE and sends the signature data to the server.

The method further includes: In a process in which the client initiates registration to the server, the client generates the key. In the process in which the client initiates registration to the server, the client stores the key, and sends the key to the TEE to synchronize the key with the TEE.

The sending the key to the TEE includes: The client sends the key to the TEE when sending a registration response data field to the TEE.

The method further includes: The client obtains a key ID of the key when generating the key; and synchronizes the key ID of the key to the TEE. The step that the client sends encrypted authentication data information to the TEE further includes: The client sends the key ID of the key to the TEE.

According to a second aspect, a signature authentication method is provided, applied to a TEE of a terminal device. A service private key required for signature authentication is embedded in the TEE. The method includes: The TEE receives encrypted authentication data information sent by a client. The TEE decrypts the authentication data information by using a key that is synchronized with the client in advance. The TEE receives a biometric feature input by a user. The TEE determines whether the authentication data information can be successfully decrypted, and if yes, generates to-be-signed data after biometric feature verification succeeds. The TEE signs for the to-be-signed data by using the embedded service private key, to obtain signature data. The TEE sends the signature data to the client.

The method further includes: in a process in which the client initiates registration to a server, receiving the key sent from the client to synchronize the key with the client.

A method for synchronizing the key with the client in advance includes: receiving the key and an ID of the key that are sent from the client, and storing a correspondence between the key and the key ID. The determining whether the authentication data information can be successfully decrypted includes: determining whether a key ID sent by the client is received; and if not, determining that the authentication data information cannot be successfully decrypted, and ending a current procedure; or if yes, retrieving, by using the key ID sent by the client, a key corresponding to the key ID; and decrypting the authentication data information by using the retrieved key.

According to a third aspect, a signature authentication apparatus is provided, applied to a client. A service private key required for signature authentication is embedded in a TEE of a terminal device in which the client is located, and the TEE performs verification on a biometric feature of a user. The apparatus includes: an authentication request module, configured to send a signature authentication request to a server; a receiving module, configured to receive authentication data information sent from the server; an encryption module, configured to encrypt the authentication data information by using a key that is synchronized with the TEE in advance; a sending module, configured to send encrypted authentication data information to the TEE; and a signature data processing module, configured to receive signature data sent from the TEE and send the signature data to the server.

According to a fourth aspect, a signature authentication apparatus is provided, applied to a TEE of a terminal device. A service private key required for signature authentication is embedded in the TEE. The apparatus includes: an encrypted information acquisition module, configured to receive encrypted authentication data information sent by a client; a decryption module, configured to decrypt the authentication data information by using a key that is synchronized with the client in advance; a biometric feature receiving module, configured to receive a biometric feature input by a user; a verification module, configured to: determine whether the authentication data information can be successfully decrypted, and perform verification on the biometric feature input by the user; a to-be-signed data generation module, configured to: after it is determined that the authentication data information can be successfully decrypted, and the biometric feature verification succeeds, generate to-be-signed data based on the authentication data information; and a signature data acquisition module, configured to sign for the to-be-signed data by using the embedded service private key, to obtain signature data; and send the signature data to the client.

According to a fifth aspect, a computing device is provided, including a memory and a processor. The memory stores executable code, and when executing the executable code, the processor implements the method according to any one of the embodiments of this specification.

The signature authentication methods and apparatuses provided in the embodiments of this specification have at least the following beneficial effects:

1. In the embodiments of this specification, an existing signature authentication process is modified. During signature authentication, an authorized client does not directly send authentication data information to a TEE, but first encrypts to-be-signed data by using a key synchronized with the TEE. In the TEE, signing requires not only a biometric feature verification success, which is performed after the biometric feature verification success only when the following conditions are met: first, the sent authentication data information needs to be encrypted; and second, the authentication data information can be successfully decrypted. Therefore, the methods in the embodiments of this specification ensure that an identity of a client that invokes a software development kit (SDK) of a signature authentication interface is authorized, that is, only an authorized client (the authorized client is a client that can encrypt authentication data information by using a correct key) can enable the TEE to complete signing. Because an attacker cannot obtain the key, the attacker cannot successfully encrypt the authentication data information. Therefore, the TEE does not sign for data sent by the attacker, thereby ensuring that a signature is not abused.

2. Because it is difficult for the TEE to generate user interface interaction with a rich execution environment (REE), it is difficult to determine whether a signature authentication request currently initiated by a client is an authorized request of a previously registered authorized client. According to the methods in the embodiments of this specification, it can be effectively ensured that a client that initially performs password-free registration and a client that initiates subsequent password-free verification are a same client.

3. The embodiments of this specification can prevent a trojan or another malicious APP from impersonating an authorized APP to perform a local signature authentication process, i.e., a password-free verification process.

BRIEF DESCRIPTION OF DRAWINGS

To describe the technical solutions in the embodiments of this specification or the related art more clearly, the following briefly describes accompanying drawings required for describing the embodiments or the related art. Clearly, the accompanying drawings in the following description show some embodiments of this specification, and a person of ordinary skill in the art may still derive other drawings from these accompanying drawings without creative efforts.

DESCRIPTION OF EMBODIMENTS

Figure 1:
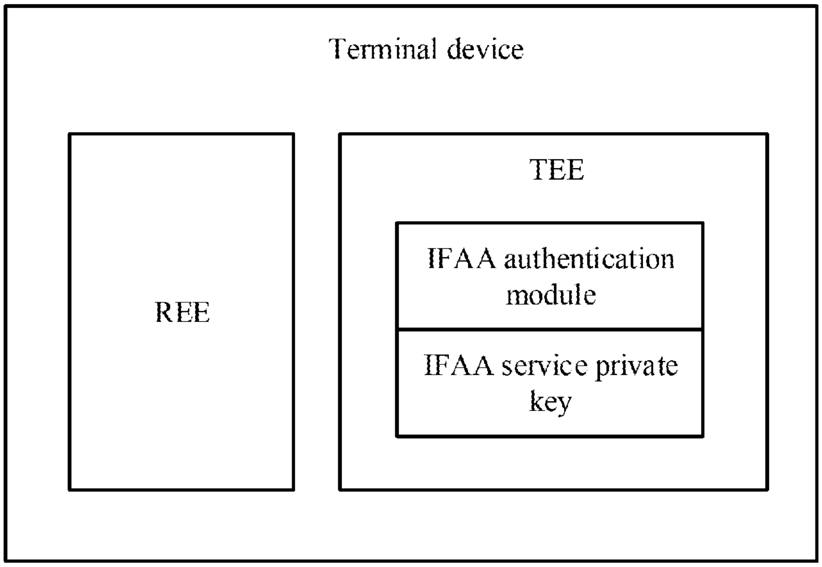
FIG. 1 is a schematic structural diagram illustrating a terminal device.

Referring to FIG. 1, in a signature authentication process, a client sends related information to a TEE, and an authentication module (authenticator) in the TEE signs for to-be-signed data by using an embedded service private key provided that the TEE detects a correct biometric feature (such as fingerprint or face information) of a user. An attacker may exploit this characteristic. For example, the attacker can download a software development kit (SDK) from the Internet, and send related protocol-compliant information to a TEE of a terminal device uninterruptedly. In this case, if the terminal device such as a mobile phone is screen locked or powered off, and a user needs to unlocks the screen of the terminal device through fingerprint input or face scanning, because the user neither knows that the attacker is continuously sending a packet to the TEE, nor knows that the attacker will use biometric feature information input by the user, the user inputs a fingerprint or scans a face. In this way, the TEE receives signature-related information sent from the attacker, and detects correct biometric feature data of the user, and the TEE signs by using a service private key. Consequently, the attacker acquires a signature of the authorized user, and attacks by using the signature, for example, performs service login or payment by counterfeiting the authorized user.

It can be seen that the signature authentication process in the related art is not secure.

The following describes, with reference to the accompanying drawings, the solutions provided in this specification.

First notably, terms used in the embodiments of this application are merely used to describe specific embodiments, and are not intended to limit this application. The terms "a", "an", and "the" of singular forms used in the embodiments of this application and the appended claims are intended to include plural forms, unless otherwise specified in the context clearly.

Understandably, the term "and/or" used in this specification merely describes an association relationship between associated objects and indicates that three relationships can exist. For example, A and/or B can indicate the following three cases: Only A exists, both A and B exist, and only B exists. In addition, the character "/" in this specification usually indicates an "or" relationship between the associated objects.

Figure 2:
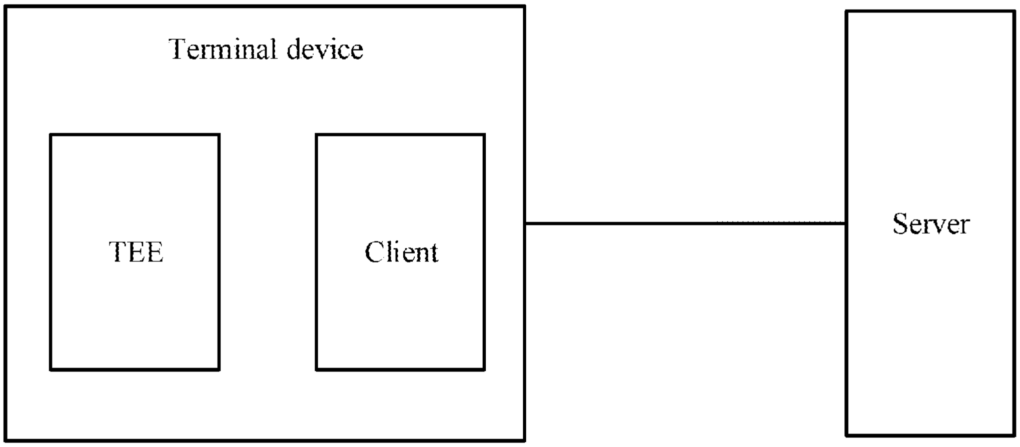
FIG. 2 is a schematic diagram illustrating a system structure to which one or more embodiments of this specification are applied.

To facilitate understanding of the methods provided in this specification, a related system architecture applicable to this specification is described first. As shown in FIG. 2, the system architecture mainly includes a terminal device and a server. The terminal device includes a TEE and various clients.

The clients are installed and run in the terminal device. The terminal device can include but is not limited to an intelligent mobile terminal, a smart household device, a network device, a wearable device, a smart medical device, a personal computer (PC), etc. The intelligent mobile device can include a mobile phone, a tablet computer, a notebook computer, a personal digital assistant (PDA), an Internet vehicle, etc. The smart household device can include a smart appliance device, such as a smart TV, a smart air conditioner, a smart water heater, a smart refrigerator, a smart air purifier, etc. The smart household device can further include a smart door lock, a smart socket, a smart light, a smart camera, etc. The network device can include a switch, a wireless AP, a server, etc. The wearable device can include a smart watch, smart glasses, a smart band, a virtual reality device, an augmented reality device, a hybrid reality device (i.e., a device that can support virtual reality and augmented reality), etc. The smart medical device can include a smart thermometer, a smart blood pressure monitor, a smart blood glucometer, etc.

The clients can be various types of applications (APPs), including but not limited to a payment application, a multimedia playback application, a map application, a text editing application, a financial application, a browser application, an instant messaging application, etc.

The server is a serving-end device of a provider that provides network services, and can be a single server, or a server group including a plurality of servers. The server is responsible for providing network services for various applications, for example, security authentication and network service level management.

Understandably, quantities of clients, terminal devices, and servers in FIG. 2 are merely examples. Any quantity can be selected and disposed based on implementation needs.

In the embodiments of this specification, a signature authentication related procedure performed by the client and the TEE is mainly modified, to improve security of signature authentication. To be specific, the embodiments of this specification include processing of the client in the terminal device and processing of the TEE in the terminal device, which are separately described below in different embodiments.

Figure 3:
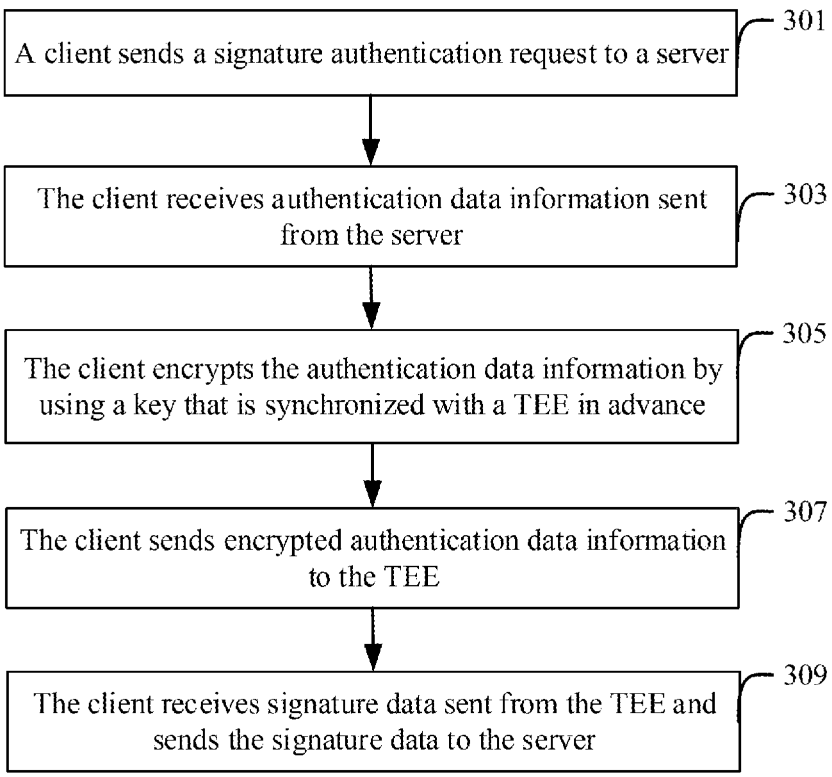
FIG. 3 is a flowchart illustrating a signature authentication method performed by a client, according to one or more embodiments of this specification.

FIG. 3 is a flowchart illustrating a signature authentication method performed by a client, according to one or more embodiments of this specification. The method is performed by a client in a terminal device. A service private key required for signature authentication is embedded in a TEE of the terminal device in which the client is located, and the TEE performs verification on a biometric feature of a user. Understandably, the method can also be performed by any apparatus, device, platform, device cluster, etc. having computing and processing capabilities. Referring to FIG. 3, the method includes step 301 to step 309.

Step 301: The client sends a signature authentication request to a server.

Step 303: The client receives authentication data information sent from the server.

Step 305: The client encrypts the authentication data information by using a key that is synchronized with the TEE in advance.

Step 307: The client sends encrypted authentication data information to the TEE.

Step 309: The client receives signature data sent from the TEE and sends the signature data to the server.

Figure 4:
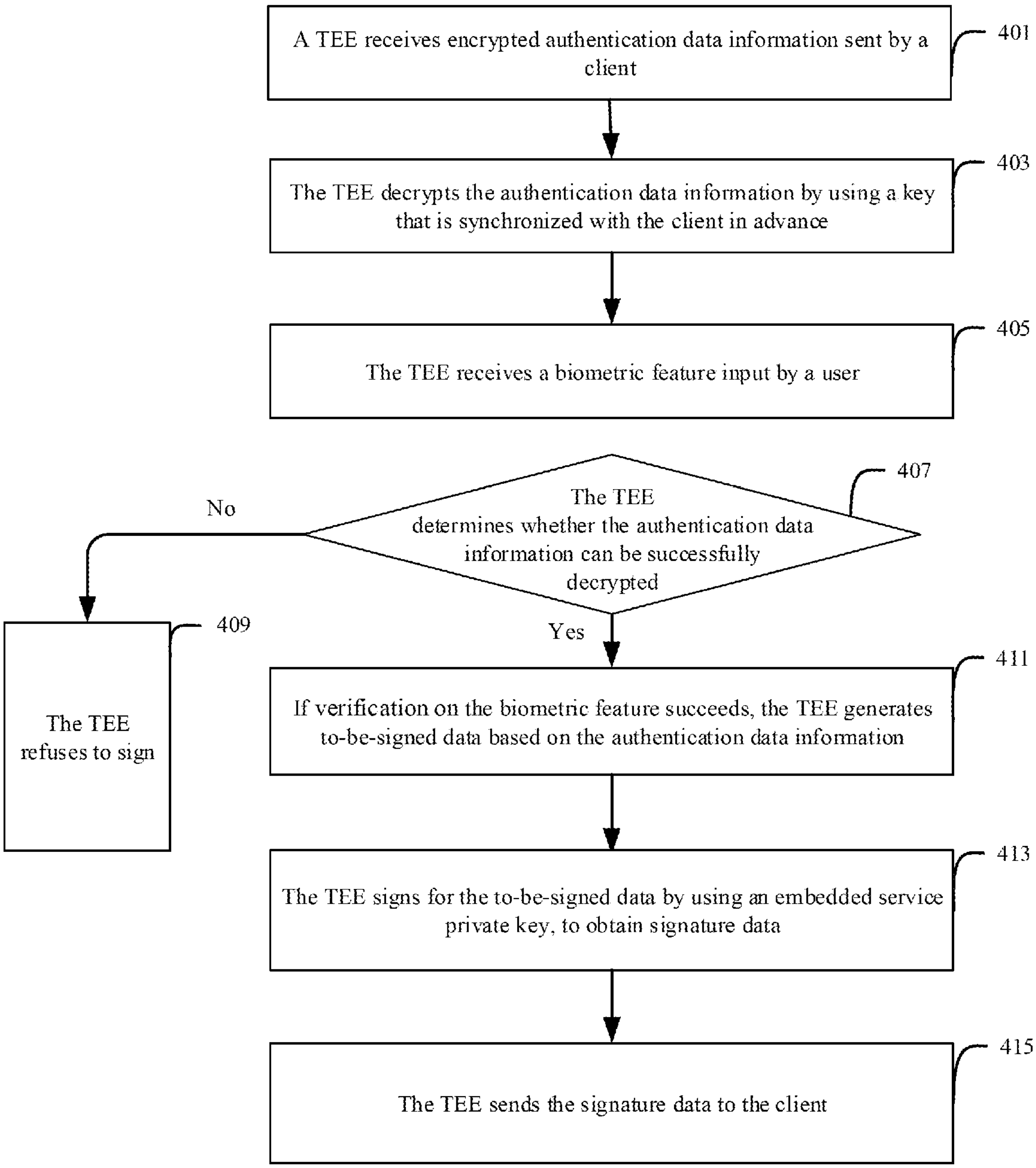
FIG. 4 is a flowchart illustrating a signature authentication method performed by a TEE, according to one or more embodiments of this specification.

FIG. 4 is a flowchart illustrating a signature authentication method performed by a TEE, according to one or more embodiments of this specification. The method is performed by a TEE in a terminal device, and a service private key required for signature authentication is embedded in the TEE. Understandably, the method can also be performed by any apparatus, device, platform, device cluster, etc. having computing and processing capabilities. Referring to FIG. 4, the method includes step 401 to step 415.

Step 401: The TEE receives encrypted authentication data information sent by a client.

Step 403: The TEE decrypts the authentication data information by using a key that is synchronized with the client in advance.

Step 405: The TEE receives a biometric feature input by a user.

Step 407: The TEE determines whether the authentication data information can be successfully decrypted, and if yes, performs step 411; otherwise, performs step 409.

Step 409: The TEE refuses to sign and ends a current procedure.

Step 411: If verification on the biometric feature succeeds, the TEE generates to-be-signed data based on the authentication data information.

Step 413: The TEE signs for the to-be-signed data by using the embedded service private key, to obtain signature data.

Step 415: The TEE sends the signature data to the client.

It can be seen from the procedures shown in FIG. 3 and FIG. 4 that, in the embodiments of this specification, an existing signature authentication process is modified. During signature authentication, an authorized client does not directly send authentication data information to a TEE, but first encrypts the authentication data information by using a key synchronized with the TEE, and then sends the authentication data information to the TEE. In the TEE, after signature-related information sent from outside is received, signing requires not only a biometric feature verification success, which is performed after the biometric feature verification success only when the following two conditions are met: first, the sent signature-related information, i.e., the authentication data information, needs to be encrypted; and second, the authentication data information can be successfully decrypted. Therefore, the methods in the embodiments of this specification ensure that an identity of a client that invokes an SDK of a signature authentication interface is authorized, that is, only an authorized client (the authorized client is a client that can encrypt authentication data information by using a correct key) can enable the TEE to complete signing. Because an attacker cannot obtain the key, the attacker cannot successfully encrypt the authentication data information. Therefore, the TEE does not sign for authentication data information sent by the attacker, thereby ensuring that a signature is not abused.

In the processes shown in FIG. 3 and FIG. 4, the authorized client needs to synchronize the key with the TEE in advance. In one or more embodiments of this specification, the key can be synchronized between the authorized client and the TEE in a registration process initiated by the client to the server (the registration process can be as follows: an authorized user inputs a fingerprint or scans a face to log in to a service provided by an application). A difference between the authorized client and the attacker is that an identity of the attacker is unauthorized and the attacker cannot complete a registration process initiated to the server, while an identity of the authorized client such as an application is authorized, and therefore, the authorized client can complete a registration process initiated to the server. Therefore, in the registration process, the key can be synchronized between the authorized client and the TEE, while the attacker cannot synchronize a key with the TEE through a registration process.

Therefore, in one or more embodiments of this specification, in a process in which the client initiates registration to the server, the client generates the key. In the process in which the client initiates registration to the server, the client stores the key, and sends the key to the TEE. In the process in which the client initiates registration to the server, the TEE receives the key sent from the client. In this way, the key is synchronized between the client and the TEE. For example, the client sends the key to the TEE when sending a registration response data field to the TEE.

In the embodiments of this specification, there are a plurality of service scenarios, that is, the TEE may need to sign for data of different clients in different service scenarios. Therefore, different clients/different service scenarios correspond to different keys. To distinguish between keys, each authorized client generates an ID of a key when generating the key, and sends the identifier (ID) of the key to the TEE when synchronizing the key to the TEE. In other words, the client synchronizes both the key and the key ID to the TEE. The TEE receives the key and the ID of the key that are sent from the client, and stores a correspondence between the key and the key ID. In this way, in the process shown in FIG. 4, an implementation process in which the TEE determines whether the authentication data information can be successfully decrypted includes: The TEE determines whether a key ID sent by the client is received. If not, the TEE determines that the authentication data information cannot be successfully decrypted, and ends a current procedure. If yes, the TEE retrieves, by using the key ID sent by the client, a key corresponding to the key ID; and the TEE decrypts the authentication data information by using the retrieved key.

Figure 5:
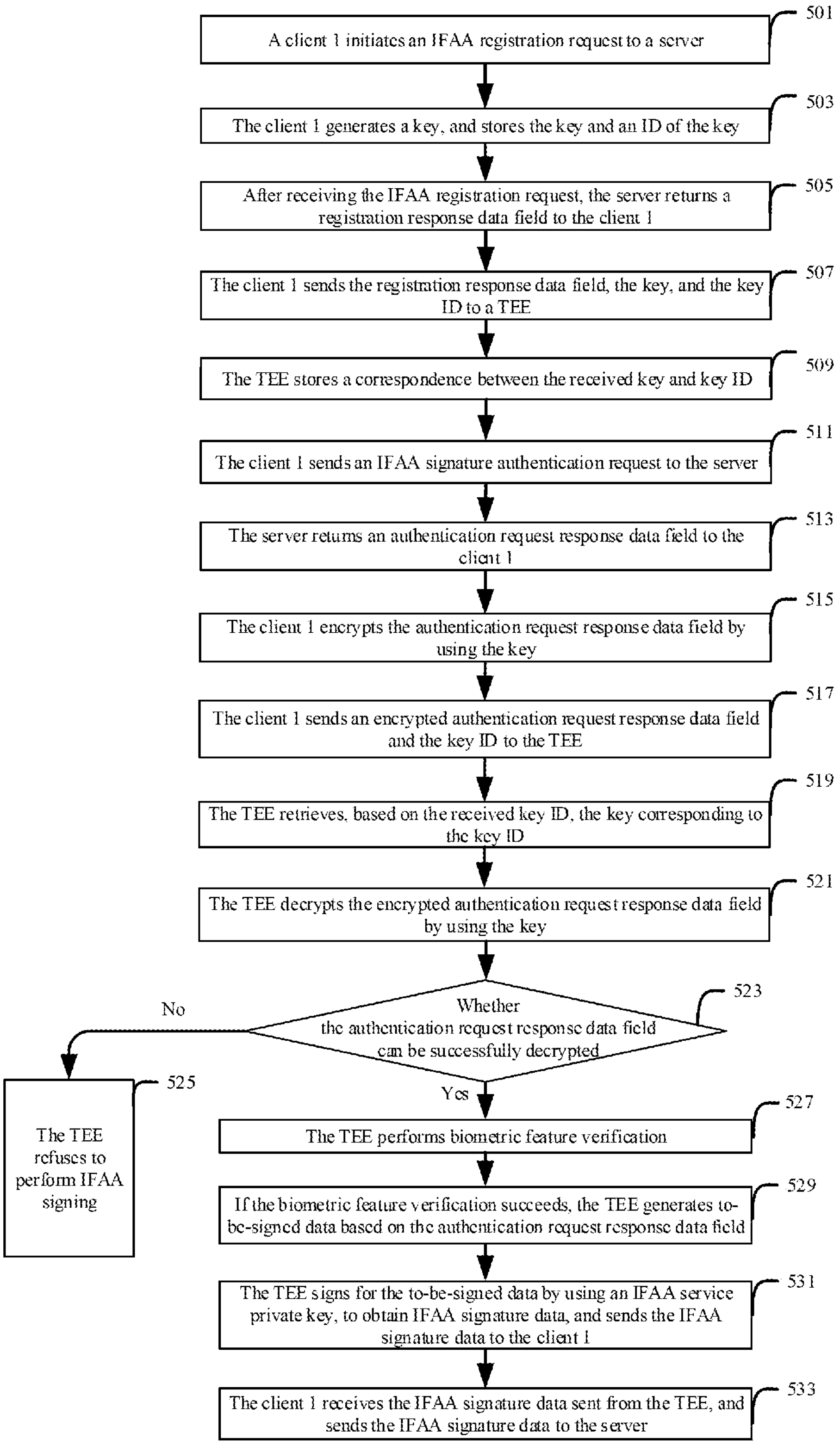
FIG. 5 is a flowchart illustrating IFAA registration and an IFAA signature authentication method performed by a client and a TEE cooperatively, according to one or more embodiments of this specification.

Using the above-mentioned IFAA protocol as an example, the following uses a specific example to describe how a client and a TEE cooperatively implement an IFAA signature authentication method. Referring to FIG. 5, the method includes two procedures. A first procedure is a process performed in advance in which an authorized client initiates IFAA registration to a server. A key and a key ID are synchronized between the client and the TEE in the IFAA registration process. A second procedure is an IFAA signature authentication process. Referring to FIG. 5, the method includes step 501 to step 533.

Step 501: A client 1 initiates an IFAA registration request to a server.

Step 501 can be an IFAA registration request initiated by a user when the user needs to enable a password-free payment function of the client 1, such as a shopping APP, and turns to fingerprint payment or face payment.

Step 503: The client 1 generates a key subsequently used for IFAA signature authentication and an ID of the key, and stores the key and the ID of the key.

Step 505: After receiving the IFAA registration request, the server serving the client 1 returns a registration response data field, i.e., a RegisterRespData field, to the client 1.

Step 507: The client 1 sends the RegisterRespData field, the key, and the key ID to a TEE.

Step 509: The TEE stores a correspondence between the received key and key ID.

In one or more embodiments of this specification, an IFAA authentication module, denoted as IFAA authenticator, in the TEE can store the correspondence between the key and the key ID.

Then, a subsequent registration procedure to be performed is the same as that in the related art.

It can be seen that through step 503, step 507, and step 509 in which the authorized client initiates the IFAA registration process to the server, the key and the ID of the key are synchronized between the client 1 and the TEE.

Step 511: When the user performs a service program function, such as shopping, by using the client 1, the client 1 sends an IFAA signature authentication request to the server.

Step 513: The server returns an authentication request response data field, i.e., an AuthReqRespData field, to the client 1.

Step 515: The client 1 encrypts the AuthReqRespData field by using the key generated in step 503.

Step 517: The client 1 sends an encrypted AuthReqRespData field and the key ID of the key to the TEE.

Step 519: The TEE retrieves, based on the received key ID, the key corresponding to the key ID.

Step 521: The TEE decrypts the encrypted AuthReqRespData field by using the retrieved key.

Step 523: The TEE determines whether the AuthReqRespData field can be successfully decrypted, and if yes, performs step 527; otherwise, performs step 525.

Step 525: The TEE refuses to perform IFAA signing and ends a current procedure.

Step 527: The TEE performs biometric feature verification.

Step 529: If the biometric feature verification succeeds, the TEE generates to-be-signed data based on the AuthReqRespData field.

Step 531: The TEE signs for the to-be-signed data by using an IFAA service private key, to obtain IFAA signature data, and sends the IFAA signature data to the client 1.

Step 533: The client 1 receives the IFAA signature data sent from the TEE, and sends the signature data to the server.

Then, IFAA signature authentication can be performed based on an IFAA signature authentication process of the related art.

In this embodiment of this specification, it can be verified whether an APP that performs password-free verification and an APP that actually registers are a same APP, to prevent malicious behavior between different APPs on a same mobile phone.

Figure 6:
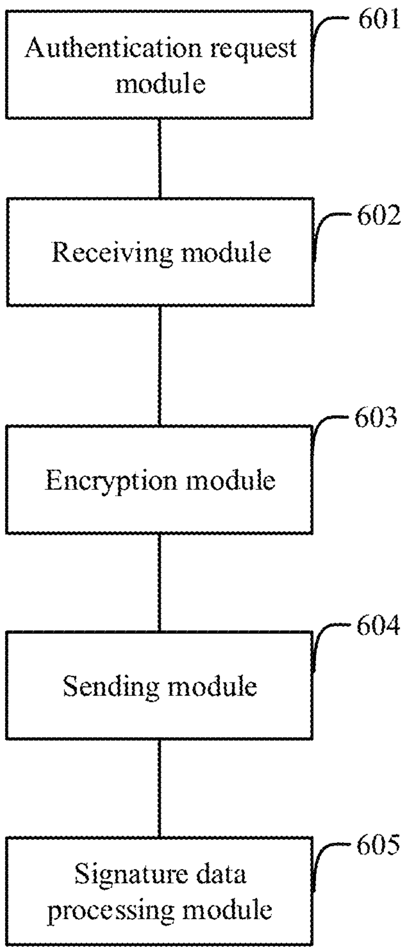
FIG. 6 is a schematic structural diagram illustrating a signature authentication apparatus applied to a client, according to one or more embodiments of this specification.

In one or more embodiments of this specification, a signature authentication apparatus is provided, applied to a client. A service private key required for signature authentication is embedded in a TEE of a terminal device in which the client is located, and the TEE performs verification on a biometric feature of a user. Referring to FIG. 6, the apparatus includes: an authentication request module 601, configured to send a signature authentication request to a server; a receiving module 602, configured to receive authentication data information sent from the server; an encryption module 603, configured to encrypt the authentication data information by using a key that is synchronized with the trusted execution environment (TEE) in advance; a sending module 604, configured to send encrypted authentication data information to the TEE; and a signature data processing module 605, configured to receive signature data sent from the TEE and send the signature data to the server.

In one or more embodiments of the apparatus shown in FIG. 6 in this specification, the apparatus further includes a registration module (not shown in the figure).

The registration module is configured to: in a process in which the client initiates registration to the server, generate and store the key, and send the key to the TEE to synchronize the key with the TEE.

In one or more embodiments of the apparatus shown in FIG. 6 in this specification, the registration module is configured to: send the key to the TEE when a registration response data field is sent to the TEE.

In one or more embodiments of the apparatus shown in FIG. 6 in this specification, the sending module 604 is further configured to send an identifier (ID) of the key used during the encryption to the TEE.

Figure 7:
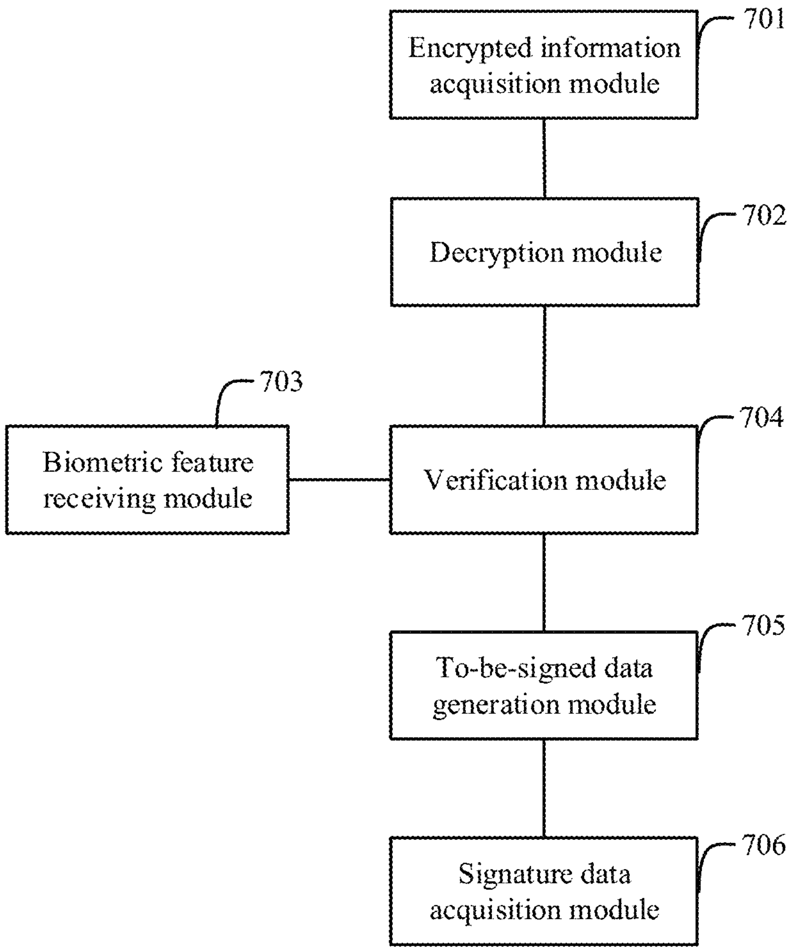
FIG. 7 is a schematic structural diagram illustrating a signature authentication apparatus applied to a TEE, according to one or more embodiments of this specification.

In one or more embodiments of this specification, a signature authentication apparatus is provided, applied to a TEE of a terminal device. A service private key required for signature authentication is embedded in the TEE. Referring to FIG. 7, the apparatus includes: an encrypted information acquisition module 701, configured to receive encrypted authentication data information sent by a client; a decryption module 702, configured to decrypt the authentication data information by using a key that is synchronized with the client in advance; a biometric feature receiving module 703, configured to receive a biometric feature input by a user; a verification module 704, configured to: determine whether the authentication data information can be successfully decrypted, and perform verification on the biometric feature input by the user; a to-be-signed data generation module 705, configured to: after it is determined that the authentication data information can be successfully decrypted, and the biometric feature verification succeeds, generate to-be-signed data based on the authentication data information; and a signature data acquisition module 706, configured to sign for the to-be-signed data by using the embedded service private key, to obtain signature data; and send the signature data to the client.

In one or more embodiments of the apparatus shown in FIG. 7 in this specification, the apparatus further includes a key synchronization module (not shown in the figure). The key synchronization module is configured to: in a process in which the client initiates registration to a server, receive the key sent from the client to synchronize the key with the client.

In one or more embodiments of the apparatus shown in FIG. 7 in this specification, the key synchronization module is configured to: receive the key and an ID of the key that are sent from the client, and store a correspondence between the key and the key ID. The verification module 704 is configured to: determine whether a key ID sent by the client is received; and if not, determine that the authentication data information cannot be successfully decrypted, and end a current procedure; or if yes, retrieve, by using the key ID sent by the client, a key corresponding to the key ID; and decrypt the authentication data information by using the retrieved key.

Notably, the above-mentioned apparatuses are generally implemented on a server side, and can be separately disposed on independent servers, or a combination of a part or all of the apparatuses can be disposed on a same server. The server can be a single server, or a server cluster including a plurality of servers. The server can be a cloud server, or referred to as a cloud computing server or a cloud host, and is a host product in a cloud computing service system. The above-mentioned apparatuses can also be implemented in a computer terminal that has a strong computing capability.

One or more embodiments of this specification provide a computer-readable storage medium. The computer-readable storage medium stores a computer program. When the computer program is executed in a computer, the computer is enabled to perform the method according to any one of the embodiments of this specification.

One or more embodiments of this specification provide a computing device, including a memory and a processor. The memory stores executable code, and when executing the executable code, the processor implements the method according to any one of the embodiments of this specification.

Understandably, the structures shown in the embodiments of this specification constitute no specific limitations on the apparatuses in the embodiments of this specification. In some other embodiments of this specification, the above-mentioned apparatuses may include more or less components than those shown in the figures, or may combine some components, or may split some components, or may have different component arrangements. The illustrated components can be implemented by hardware, software, or a combination of software and hardware.

The embodiments of this specification are described in a progressive way. For same or similar parts of the embodiments, mutual references can be made to the embodiments. Each embodiment focuses on a difference from other embodiments. In particular, the apparatus embodiments are basically similar to the method embodiments, and therefore are described briefly. For related parts, references can be made to related descriptions in the method embodiments.

A person skilled in the art should be aware that in the above-mentioned one or more examples, functions described in this application can be implemented by hardware, software, firmware, or any combination thereof. When the functions are implemented by software, these functions can be stored in a computer-readable medium or transmitted as one or more instructions or code in a computer-readable medium.

The specific implementations described above further describe the purposes, technical solutions, and beneficial effects of this application. Understandably, the descriptions above are merely specific implementations of this application and are not intended to limit the protection scope of this application. Any modification, equivalent replacement, or improvement made based on the technical solutions of this application shall fall within the protection scope of this application.

The invention claimed is:

1. A signature authentication method, comprising:

generating, by a client application that is installed and running on a terminal device, a key during a process of initiating registration to a server;

storing, by the client application, the key;

sending, by the client application, the key to a trusted execution environment (TEE) of the terminal device in which the client application is installed for storage at the TEE, wherein the key is generated by the client application prior to being received and stored by the TEE;

sending, by the client application, a signature authentication request to the server;

receiving, by the client application, authentication data information sent from the server;

encrypting, by the client application, the authentication data information by using the key that is generated by the client application;

sending, by the client application, encrypted authentication data information to the TEE;

receiving, by the client application, signature data sent from the TEE, wherein the signature data is generated by the TEE based on successfully decrypted authentication data information at least after the TEE successfully decrypts the encrypted authentication data information using the key that is generated by the client application; and sending, by the client application, the signature data to the server.

2. The method according to claim 1, wherein the sending the key to the TEE comprises:

sending, by the client application, the key to the TEE when sending a registration response data field to the TEE.

3. The method according to claim 1, wherein the method further comprises:

obtaining, by the client application, a key ID of the key when generating the key;

synchronizing, by the client application, the key ID of the key to the TEE; and sending, by the client application, the key ID to the TEE.

4. The signature authentication method of claim 1, wherein the key generated by the client application comprises a key used for password-free biometric signature authentication, and wherein the process of initiating registration to the server comprises a password-free biometric signature registration process.

5. The signature authentication method of claim 1, wherein the signature data is generated by the TEE by signing the successfully decrypted authentication data information using a service private key embedded in the TEE.

6. The signature authentication method of claim 5, wherein the service private key embedded in the TEE comprises a hardware-embedded biometric signature private key.

7. A signature authentication apparatus, comprising:

at least one processor; and one or more memories coupled to the at least one processor and storing programming instructions for execution by the at least one processor to perform operations comprising:

generating, by a client application, a key during a process of initiating registration to a server;

storing, by the client application, the key;

sending, by the client application, the key to a trusted execution environment (TEE) for storage at the TEE, wherein the key is generated by the client application prior to being received and stored by the TEE;

sending, by the client application, a signature authentication request to the server;

receiving, by the client application, authentication data information sent from the server;

encrypting, by the client application, the authentication data information by using the key that is generated by the client application;

sending, by the client application, encrypted authentication data information to the TEE;

receiving, by the client application, signature data sent from the TEE, wherein the signature data is generated by the TEE based on successfully decrypted authentication data information at least after the TEE successfully decrypts the encrypted authentication data information using the key that is generated by the client application; and sending, by the client application, the signature data to the server.

8. The apparatus according to claim 7, wherein the sending the key to the TEE comprises:

sending the key to the TEE when sending a registration response data field to the TEE.

9. The apparatus according to claim 7, wherein the operations further comprise:

obtaining a key ID of the key when generating the key;

synchronizing the key ID of the key to the TEE; and sending the key ID to the TEE.

10. The apparatus according to claim 7, wherein the key generated by the client application comprises a key used for password-free biometric signature authentication, and wherein the process of initiating registration to the server comprises a password-free biometric signature registration process.

11. The apparatus according to claim 7, wherein the signature data is generated by the TEE by signing the successfully decrypted authentication data information using a service private key embedded in the TEE.

12. The apparatus according to claim 11, wherein the service private key embedded in the TEE comprises a hardware-embedded biometric signature private key.

13. A non-transitory, computer-readable medium storing one or more instructions executable by at least one processor to perform operations comprising:

generating, by a client application that is installed and running on a terminal device, a key during a process of initiating registration to a server;

storing, by the client application, the key;

sending, by the client application, the key to a trusted execution environment (TEE) of the terminal device in which the client application is installed for storage at the TEE, wherein the key is generated by the client application prior to being received and stored by the TEE;

sending, by the client application, a signature authentication request to the server;

receiving, by the client application, authentication data information sent from the server;

encrypting, by the client application, the authentication data information by using the key that is generated by the client application;

sending, by the client application, encrypted authentication data information to the TEE;

receiving, by the client application, signature data sent from the TEE, wherein the signature data is generated by the TEE based on successfully decrypted authentication data information at least after the TEE successfully decrypts the encrypted authentication data information using the key that is generated by the client application; and sending, by the client application, the signature data to the server.

14. The non-transitory, computer-readable medium according to claim 13, wherein the sending the key to the TEE comprises:

sending, by the client application, the key to the TEE when sending a registration response data field to the TEE.

15. The non-transitory, computer-readable medium according to claim 13, wherein the operations further comprise:

obtaining, by the client application, a key ID of the key when generating the key;

synchronizing, by the client application, the key ID of the key to the TEE; and sending, by the client application, the key ID to the TEE.

16. The non-transitory, computer-readable medium according to claim 13, wherein the key generated by the client application comprises a key used for password-free biometric signature authentication, and wherein the process of initiating registration to the server comprises a password-free biometric signature registration process.

17. The non-transitory, computer-readable medium according to claim 13, wherein the signature data is generated by the TEE by signing the successfully decrypted authentication data information using a service private key embedded in the TEE.

18. The non-transitory, computer-readable medium according to claim 17, wherein the service private key embedded in the TEE comprises a hardware-embedded biometric signature private key.

* * * * *